United States Patent

[11] 3,595,078

[72] Inventors Maurice Sidney Beck
10 Hazelhurst Road, Bradford 9, Yorkshire, England;
Andzrej Plaskowski, ul. Anielewicza 33 m 27, Warsaw, Poland
[21] Appl. No. 756,969
[22] Filed Sept. 3, 1968
[45] Patented July 27, 1971
[73] Assignee National Research Development Corporation, London, England
[32] Priority Sept. 6, 1967
[33] Great Britain
[31] 40688/67

[54] POWDER FLOW MEASUREMENT
11 Claims, 8 Drawing Figs.

[52] U.S. Cl. .......... 73/194 F, 73/28
[51] Int. Cl. .......... G01f 1/00
[50] Field of Search .......... 73/194; 324/71, 61

[56] References Cited
UNITED STATES PATENTS

| | | | |
|---|---|---|---|
| 2,315,805 | 4/1943 | Mayo et al. | 73/194 |
| 2,491,445 | 12/1949 | Cunningham et al. | 73/194 |
| 3,184,967 | 5/1965 | Rogers | 73/194 |
| 3,278,747 | 10/1966 | Ohmart | 73/194 UX |
| 3,425,274 | 2/1969 | Clement et al. | 73/194 |

OTHER REFERENCES

Eckhardt, German Printed App. No. 1,122,292, Jan. 1962, 73-28.

Primary Examiner—Charles A. Ruehl
Attorney—Cushman, Darby and Cushman

ABSTRACT: The flow of a particulate material when conveyed hydrodynamically by means of a flowing fluid has a noise content consisting of random variations in the concentration of the particulate material. This noise content is sensed at two points separated by a known distance along the flow path of the material, and the sensed disturbances are cross-correlated to establish a transit time for a given disturbance between the two points, thus enabling the flow rate of the particulate material to be determined.

T = TRANSIT TIME OF POWDER BETWEEN ELECTRODES 3 AND 4

POWDER FLOW MEASUREMENT

The invention relates to the measurement of the flow of particulate materials conveyed hydrodynamically by means of a flowing fluid, and is concerned more particularly, but not exclusively, with the measurement of the flow of powdered solids in pneumatic conveyors.

Pneumatic conveyors are simple, reliable and efficient means for transporting powdered solid materials, and are used in many industrial processes.

The automatic control of such processes frequently requires that continuous measurements of the flow rates of materials used in the process should be made.

This has presented difficulties when pneumatic conveyors are used for transporting solid materials as the majority of solid material flow measuring devices will only operate when the solid material is not in a fluidized state, and therefore require the removal of material from the conveyor, thus destroying some of the essential simplicity and reliability of such conveyors. Devices depending upon pressure-drops, analogous to venturi meters and pilot tubes, have been proposed but they require that an obstruction should be placed in the conveyor to cause the pressure-drop, and there is therefore a risk of causing a blockage of the conveyor. Another disadvantage of such devices is that high accuracy has not been attained due to the fact that the measured pressure-drop is due to both the solid and the airflow.

A nucleonic method of measuring powder flow has been proposed which involves no actual obstruction in the conveyor, but the method only works satisfactorily with a gravity-flow system and requires the material to pass through a sharp double bend at the point of measurement; the risk of blockage of the conveyor therefore remains.

It has been observed that the flow of solid material in a pneumatic conveyor has a "noise" content which takes the form of random small concentrations and rarefactions that are superimposed upon the general flow of material and are propagated along the conveyor with the same velocity as the general flow.

It is to be understood that similar considerations will apply if fluids other than air are used as the conveyor medium, and the particulate material may be a liquid in droplet form.

According to the present invention there is provided a method of and apparatus for measuring the flow of a particulate material conveyed hydrodynamically by means of a flowing fluid, the method comprising the steps of sensing the passage of random disturbances in the flow of the material past points separated by a known distance, and cross-correlating the sensed disturbances to establish a transit time for the passage of the disturbance over the known distance; the apparatus according to the invention comprises at least two sensing elements separated by a known distance along a path for flow of the material, the sensing elements being adapted to detect small changes in the quantity of material flowing past them, and means for deriving the transit time between the sensing elements of random disturbances in the flow of the material by cross-correlation of signals generated by the sensing elements.

Preferably the particulate material is a powdered solid flowing in a pneumatic conveyor and the sensing elements are capacitors built into the wall of the conveyor, the disturbance being detected by changes in the capacitances of the said capacitors.

The mass flow rate in a pneumatic conveyor can be determined if two parameters are measured, these are:

1. the velocity of flow of the powdered material; $v(t)$
2. The solids loading in a unit length of the conveyor; $w(t)$ If these quantities vary with time, then the total mass flow in $T$ secs. is equal to:

$$\int_{t=0}^{t=T} v(t)w(t)\,dt \quad (1)$$

Using the invention, these two parameters can be measured separately or simultaneously, and, by way of example, an embodiment of the invention will be described in which the above parameters are measured separately and another embodiment will be described in which the two parameters are measured simultaneously.

Figures 1, 2:
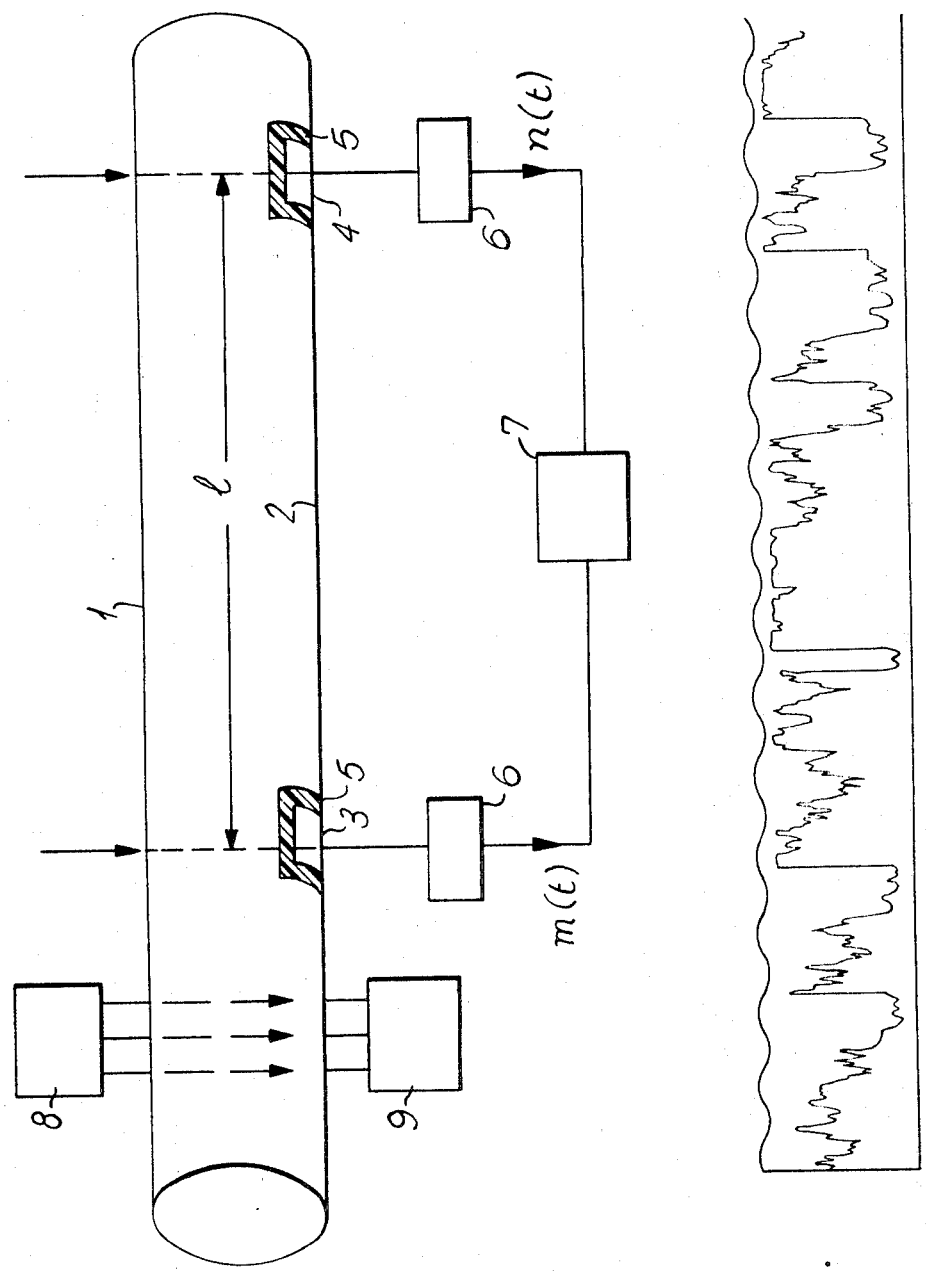
FIG. 1 shows diagrammatically an embodiment of the invention in which the velocity of solids flow and the known solids loading are measured independently.
FIG. 2 shows a typical output curve from a capacitance-to-electric transducer used in the embodiment of FIG. 1.

Referring to FIG. 1, a pneumatic conveyor 1 has mounted in a wall 2 two electrodes 3 and 4 that are separated by a known distance $l$. Each of the electrodes 3 and 4 consists of a portion of the wall 2 that is separated from the remainder of the wall 2 by an insulating joint 5. The electrodes 3 and 4 each form capacitances with the remainder of the wall 2, the dielectric of which is the air/solid mixture flowing through the conveyor 1. Thus variations in the air/solid mixture will induce changes in the capacitance of these capacitors. These changes in capacitance are sensed by respective capacitance-to-electric transducers 6, to which the electrodes 3 and 4 are connected. The transducers 6 produce, in a manner to be described more fully later, signals that are representative of small disturbances in the flow of solids past the electrodes 3 and 4. These signals are processed in a computer 7, in a manner to be described more fully later, to give the transit time of any given disturbance in the flow from one electrode to the other. From this transit time, as the separation $l$ of the electrodes 3 and 4 is known, the velocity of solids flow is derived. A source 8 of $\gamma$-radiation passes a beam of $\gamma$-radiation through the conveyor 1 to a detector 9, and the solids loading of the conveyor 1 is derived in a known manner from the amount of $\gamma$-radiation absorbed during its passage through the conveyor 1.

The transducers 6 are so designed that they are self-compensating for changes in the standing capacitance of their respective electrodes, and are insensitive to low frequency changes in capacitance of the electrodes. As the result of a large number of small capacitance changes caused by individual particles cross the field of the electrode 3, capacitance noise $x(t)$ will be generated and FIG. 2 shows a typical output signal from the transducer connected to electrode 3; that from the transducer connected to electrode 4 will be similar. This noise is Gaussian noise which can be approximated by band-limited white noise, having a power spectrum $\Phi_x(f)$. By suitable design the transducers can be made to have a cut-off frequency lower than the cut-off frequency of the power spectrum $\Phi_x(f)$.

The frequency spectrum of the output signal from the transducer coupled to the electrode 3 is:

$$\Phi_m(f) = \Phi_x(f)\,|K_1 G_1(jf)|^2 \quad (2)$$

where $K_1 G_1(jf)$ is the frequency response of the transducer.

Figure 3A:
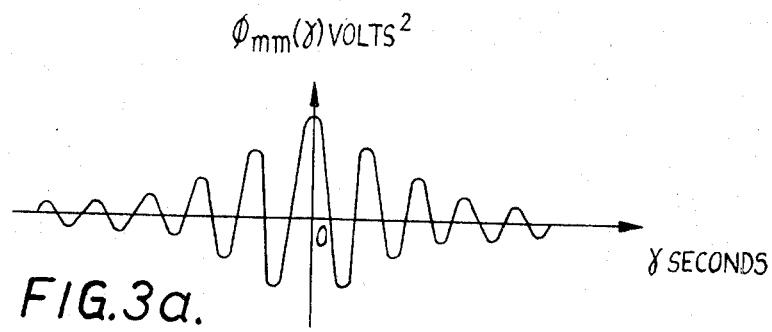
FIG. 3a shows a plot of an autocorrelation function of the output from the transducers used in the embodiment of FIG. 1.
Figure 3B:
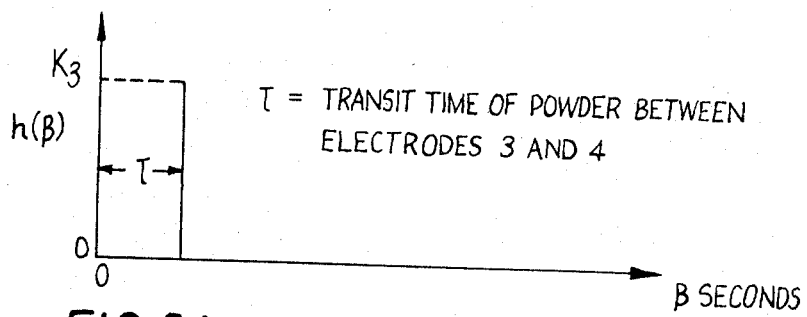
FIG. 3b shows the impulse response of the flowpath.

The transducer output signal is band-pass random noise, its autocorrelation taking the form $\Phi$ mm. shown in FIG. 3a.

Figure 4A:
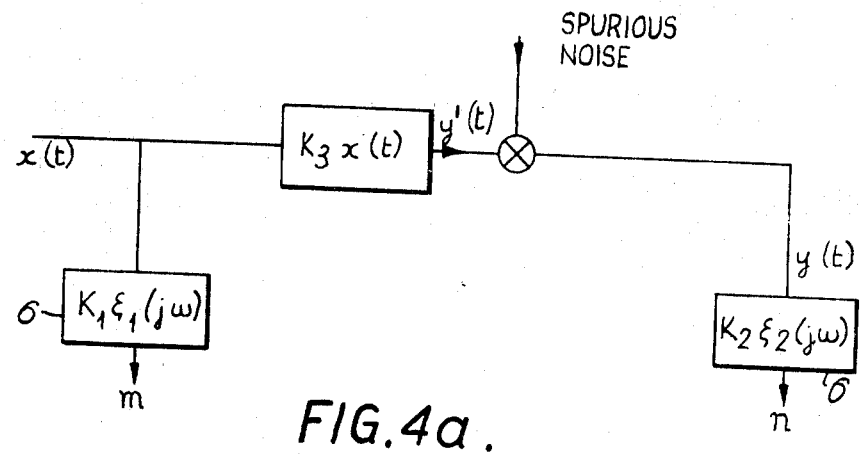
FIGS. 4a, 4b and 4c are diagrammatic representations of a mathematical analysis of the invention.

The velocity measuring section of the pneumatic conveyor 1 between the electrodes 3 and 4 (FIG. 1) can be represented by the model in FIG. 4a. The noise at the electrode 3 is $x(t)$: a fraction $K_3 x(t)$ is delayed by a pure time delay $\tau$, giving a contribution $y^1(t)$ at electrode 4, where $\tau$ is the transit time of the power between the electrodes. This delayed noise $y^1(t)$ cannot be measured directly, because there will be a certain amount of random decomposition of the noise pattern as the powder travels between the electrodes. Following the principle of linear superposition the decomposition can be represented by a single spurious noise $z^1(t)$, which is added to the delayed noise $y^1(t)$ to give a measured capacitance noise $y(t)$ at the electrode 4.

Figure 4B:
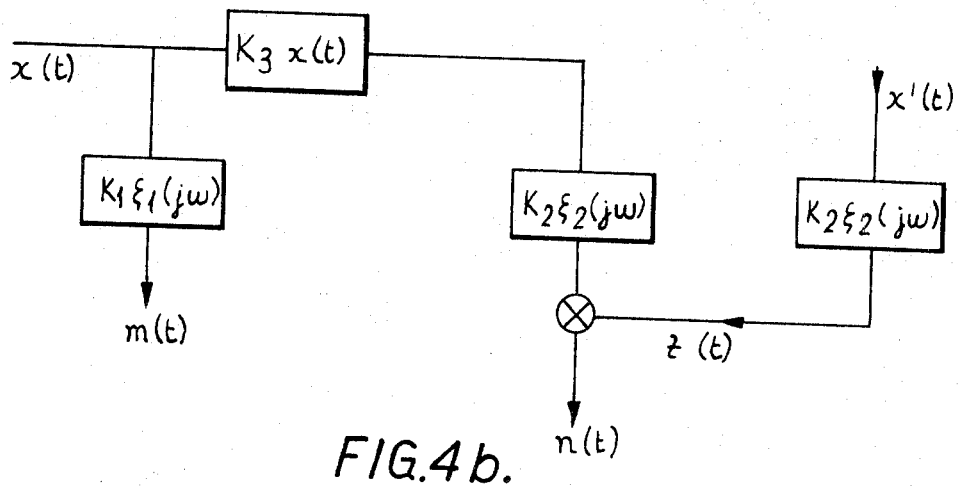
Figure 4C:
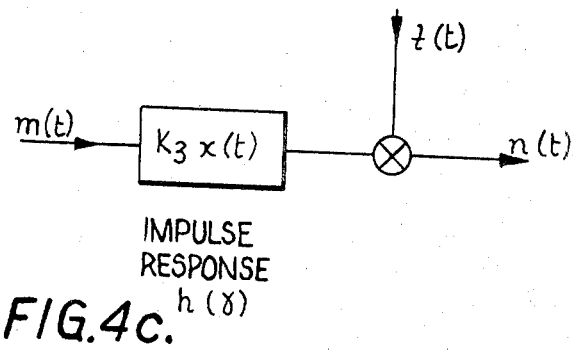

The block diagram model (FIG. 4a) can be regrouped as shown in FIG. 4b. A further simplification can then be made because the transducers in each measurement channel are identical. Hence any phase delay in the transducers will cancel out and does not affect the relative phase of the transducer output signals denoted by $m(t)$ and $n(t)$, respectively. This leads to the model in FIG. 4c.

The velocity of solids flow is derived from the transit time of the flow disturbances, which are found by using correlation techniques. This is necessary because the traces of the outputs from the two electrodes 3 and 4 are not the same, due to the random effects that occur during the time of transit from electrode 3 to the electrode 4, and the passage of any given disturbance between the electrodes 3 and 4 is not immediately apparent.

The transit time of a disturbance between the electrodes 3 and 4 is derived as follows.

It can be shown that if two functions $a(t)$ and $b(t)$ are related by a transfer function of the form:
$$b(t) = a(t - \tau_1) \quad (3)$$
where $a(t)$ is a nonperiodic function which can be considered to be statistically stationary over a period of time $\xi$, then the cross-correlation function between them which is given by:
$$\phi_{ab}(\gamma) = \frac{1}{\xi} \int_{T-\xi}^{T} a(t) b(t - \eta) dt \quad (4)$$
will have a maximum value when $\gamma = \tau_1$
where $\tau_1$ is the time delay of the system, that is when the correlation time delay is equal to the pure time delay of the system.

The output signal from the transducer connected to electrode 3 is $m(t)$ and that from the transducer connected to electrode 4 is $n(t)$, and these will be related by:
$$n(t) = K_3 m(t - \tau) \quad (5)$$
where $\tau$ represents the actual time delay of the transit of the flow disturbances between the electrodes 3 and 4.

Equation (5) has the same form as equation (3) and therefore the signals $m(t)$ and $n(t)$ can be cross-correlated by a function similar to equation (4).

It can be shown that the signals $m(t)$, $n(t)$ are related by the cross-correlation function:
$$\phi_{mn}(\gamma) = \int_0^\infty h(\beta) \phi_{mm}(\gamma - \beta) d\beta + E(\gamma) \quad (6)$$
where $\beta$ represents a second time variable, $h(\beta)$ is the impulse response of the model in FIG. 4c and $E(\gamma)$ is the expected error in the estimate of $\Phi_{mn}(\gamma)$ caused by the filtered spurious noise $z(t)$. Also, the cross-correlation function of the signals $m(t)$ and $n(t)$ is given by:
$$\phi_{mn}(\gamma) = \frac{1}{\xi_1} \int_0^{\xi_1} n(t) m(t - \gamma) dt \quad (7)$$
and the autocorrelation of the signal $m(t)$ is given by
$$\phi_{mm}(\gamma) = \frac{1}{\xi_1} \int_0^{\xi_1} m(t) m(t - \gamma) dt \quad (8)$$

Figure 3C:
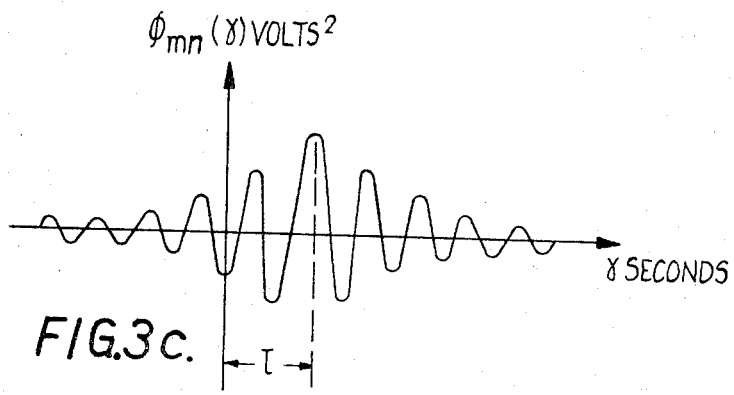
FIG. 3c shows the cross-correlation function of the transducer outputs.

The impulse response $h(\beta)$ of the model (FIG. 4c) has the values:
$$h(\beta) = K_3 \text{ when } \beta = \tau$$
$$h(\beta) = 0 \text{ when } \beta \neq \tau \quad (9)$$
From (9) the integral in equation (6) is single valued when $\beta = \tau$ and zero elsewhere therefore
$$\Phi_{mn}(\gamma) = K_3 \Phi_{mn}(\gamma - \tau) + E(\gamma) \quad (10)$$
The relationship between $\Phi_{mn}(\gamma)$ and $(\gamma)$ will thus take the form shown in FIG. 3c, neglecting the error $E(\gamma)$. The time delay of the maximum value of the cross-correlation function $\Phi_{mn}(\gamma)$ occurs when $\gamma = \tau$ which is the transit time of the powder between the electrodes 3 and 4.

The velocity of solids flow is then given by $v = 1/\tau$ and the mass flow rate will be given by:

$$m = V \int_0^{t=1 \text{ sec}} W(t) dt \quad (11)$$

where $W(t)$ is the loading of the conveyor which, as described, is found by means of the absorption of $\gamma$-radiation L the material flowing in the conveyor 1.

The computer 7 handles the data as a sampled data series and accordingly equation (7) must be expressed in finite difference form. For a sampling interval of $\delta$ seconds:

$$\phi_{mn}(i) = \frac{1}{L+1} \sum_{K=K_p-L}^{K=K_p} \Delta n(k) \Delta m(k-i) \quad (12)$$

Where $k_p$ is the present value of the sampling evolutionary variable, $\xi_1 = \delta L$, where $l$ in an integer; $\gamma = i\delta$ where $i$ is an integer; and $\Delta$ denotes the deviation from the average value. The use of the deviation does not alter the shape of the correlation, it causes the correlation function to have a zero mean value and removes the possibility of numerical overflow in the computer.

The computer 7 can be an online digital computer having a high speed input multiplexer to read the signals $m(t)$ and $n(t)$, as shown in FIG. 1. A suitable sampling interval for multiplexer could be 0.5 ms. The computer is programmed to calculate equation (12) for different values of $i$, to locate the maximum value of the function $\Phi_{mn}(i)$ and hence the corresponding value of $i$, and to calculate the mass flow rate from the equation (11) if a nucleonic method is employed to measure the loading of powder. Alternatively, in the second embodiment equation (13) below can be used.

It is to be noted that in the embodiment described above no assumptions have been made about the relationship between the output of the transducers and the loading of the conveyor 1 and therefore saturation of the output signals from the transducers is acceptable. However, in a second embodiment of the invention transducers are used, the outputs of which are linearly related to the loading in the conveyor 1, or are related in some other determinate manner in order that the average loading of the conveyor 1 may be determined. This may be done by modification to the transducers used in the first embodiment if the permittivity of the conveyed material is either known or can be measured.

The permittivity can be measured by a capacitance electrode and suitable transducer which is positioned either in a feed hopper (not shown) or in a hopper into which the powder is discharged (also not shown). In this case care must be taken to ensure that the output signals from the transducers 6 do not saturate.

In such cases, where the permittivity of the powder is either sensibly constant, or it only varies as a result of moisture changes and it can be measured, it can be shown that the velocity and loading can both be determined from the cross-correlation function given by equation (12), giving:
$$[M(t)] = K_4 \Phi_{mn}^*(i)/\epsilon i^* \quad (13)$$
where $[M(t)]$ is the mass flow averaged over an integration period $\xi_1$ corresponding to $L$ in equation (12), $K_4$ is a calibration constant for the installation, $\epsilon$ is the permittivity of the powder, $\Phi^*_{mn}(i)$ is the maximum value of the cross-correlation function $\Phi_{mn}(i)$, and $i^*$ is the corresponding value of $i$.

What we claim:
1. A method of measuring the flow of a particulate material conveyed hydrodynamically by means of a flowing fluid, said method comprising
   obtaining first and second signals by sensing the passage of naturally occuring random disturbances in the flow of the particulate material respectively past first and second points separated by a known distance along a path for flow of the material, and
   deriving the transit time of the particulate material over said known distance by ascertaining that value of the time delay between said first and second signals for which the cross-correlation function of said first and second signals has its maximum value.

2. A method according to claim 1, wherein the disturbances are variations in the concentration of the particulate material in said fluid.

3. A method according to claim 2, including the step of measuring the mass loading of the particulate material per unit length of the path for flow of the material.

4. A method according to claim 1 wherein the particulate material is a powdered solid and said path for flow of the particulate material is provided by a pneumatic conveyor.

5. Apparatus for measuring the flow of a particulate material conveyed hydrodynamically by a flowing fluid along a given path, said apparatus comprising
- a first sensing element operative to generate a first signal corresponding to small random changes in the quantity of the particulate material flowing past a first point in said given path,
- a second sensing element operative to generate a second signal corresponding to small random changes in the quantity of the particulate material flowing past a second point in said given path,
- said first and second points being separated by a known distance along said path, and
- means for ascertaining that value of the time delay between said first and second signals for which the cross-correlation function of said first and second signals has its maximum value.

6. Apparatus according to claim 5, wherein said path is provided by a pneumatic conveyor.

7. Apparatus according to claim 5, wherein each of said sensing elements includes an electrode, disposed so that variations in the quantity of said material flowing past the electrode causes corresponding changes in the capacitance of the electrode.

8. Apparatus according to claim 7, wherein said electrodes form part of a wall of a pneumatic conveyor.

9. Apparatus according to claim 5, including means for measuring the mass loading of material per unit length of said path.

11. Apparatus according to claim 9, wherein said means for measuring the mass loading per unit length of said path comprises a source of radiation situated on one side of said path and detecting means situated on the opposite side of said path.

11. Apparatus for measuring the flow of a particulate material conveyed hydrodynamically by a flowing fluid along a given path, said apparatus comprising
- a first electrode disposed at a first point in said given path so that small random changes in the quantity of the particulate material flowing past said first point cause corresponding changes in the capacitance of the first electrode,
- a second electrode disposed at a second point in said given path so that small random changes in the quantity of the particulate material flowing past said second point cause corresponding changes in the capacitance of the second electrode,
- said first and second points being separated by a known distance along said path,
- a first transducer means for producing a first electrical signal related to the changes in capacitance of said first electrode,
- a second transducer means for producing a second electrical signal related to the changes in capacitance of said second electrode, and
- means for ascertaining that value of the time delay between first and second signals for which the cross-correlation function of said first and second signals has its maximum value.